United States Patent Office 3,692,723
Patented Sept. 19, 1972

3,692,723
AQUEOUS DISPERSION OF A COPOLYMER OF ETHYLENE AND VINYL ACETATE AND HEAT MELTING ADHESIVE COMPRISING SAME
Masanori Kasagi and Koreaki Gunjigake, Tokyo, Japan, assignors to Denki Kagaku Kogyo Kabushiki Kaisha, Tokyo, Japan
No Drawing. Filed Mar. 17, 1970, Ser. No. 20,428
Claims priority, application Japan, Mar. 20, 1969, 44/20,799
Int. Cl. C08f 3/56, 29/12
U.S. Cl. 260—29.6 E    12 Claims

ABSTRACT OF THE DISCLOSURE

Aqueous dispersions and heat melting adhesives comprising same, which dispersions contain a copolymer of at least ethylene and vinyl acetate wherein the ethylene content is from 30 to 98% by weight, the copolymer having been prepared by a copolymerization process utilizing a particular combination of nonionic emulsifier, anionic emulsifier and protective colloid.

BACKGROUND OF THE INVENTION

Field of the invention

The present invention relates to an aqueous dispersion and more particularly to an aqueous dispersion of a copolymer of 30–98% by weight ethylene and vinyl acetate or a copolymer containing 30–98% by weight ethylene, prepared by copolymerizing ethylene, vinyl acetate, and a compound copolymerizable with these monomers, said aqueous dispersion having been prepared using ternary surface active agents comprising a nonionic surface active agent, an anionic surface active agent, and a high molecular weight protective colloid.

The present invention also relates to a heat melting adhesive comprising such an aqueous dispersion and being capable of providing a film of such dispersion at temperatures lower than 100° C., said film being readily melted at comparatively low temperatures by a heating means such as an electric iron, heat press or hot roll and providing strong adhesive power when cooled.

Description of the prior art

Processes for preparing aqueous dispersions of copolymers of ethylene and vinyl acetate are known. For example, an aqueous dispersion of such copolymers may be prepared by using, as an emulsifier, 0.1–10% by weight, based on the water present, of a potassium or sodium salt of sulfuric or sulfonic acid, a quaternary ammonium salt of cetyltrimethylammonium bromide or the like (U.S. Pat. 2,703,794), or a sodium sulfonate of a hydrocarbon having 14–16 carbon atoms (Japanese patent publication No. 8,988/63).

In general, an aqueous dispersion of a copolymer comprising at least ethylene and vinyl acetate may be prepared by a low pressure method, wherein the copolymerization reaction is carried out at an ethylene pressure of less than about 60 atmospheres, or by a high pressure method wherein the reaction is carried out under an ethylene pressure of about 100 or above atmospheres.

However, applicants have confirmed that, in the low pressure copolymerization reaction, wherein vinyl acetate is present as drops of liquid in an aqueous medium and the ethylene is dissolved into such drops of vinyl acetate, the solubility of the ethylene in such drops imposes the upper limit of ethylene in the resulting copolymer.

Accordingly, in order to prepare a copolymer containing a higher proportion of ethylene than in copolymers prepared in such conventional methods, the ratio of ethylene to vinyl acetate supplied to the reaction must be greatly increased.

Further, copolymers prepared by such methods vary widely in composition.

In order to overcome the above disadvantages, there has been suggested a method whereby an organic solvent such as n-hexane, cyclohexane, benzene, toluene and the like, which readily dissolves ethylene, but which is insoluble in water, is employed. However, this method adversely affects the stability of emulsifier and is therefore impractical for the production of the aqueous dispersions of this invention.

For the above reasons, therefore, the low pressure method is unsuitable for preparing ethylene-vinyl acetate copolymers containing more than 30% by weight ethylene.

On the other hand, in the high pressure method, an aqueous dispersion of a copolymer having any desired composition can be prepared, since all of both the ethylene and the vinyl acetate supplied to the reactor are mixed in the desired mixing ratio and are present in the aqueous medium in an emulsified state.

However, in the high pressure method, it is required either that a large quantity of emulsifier be used or that there be employed a specific emulsifier for stabilizing the dispersed liquid monomer drops in the aqueous medium, since the entire amount of ethylene supplied takes part in the reaction and the volume of the monomer in the aqueous medium is therefore increased.

It has been found, however, that if the amount of emulsifier is increased, the properties of the aqueous dispersion obtained are adversely affected. For example, when such an aqueous dispersion is used in a paint or adhesive, the adhesivity, water resistance, mechanical strength, etc., are reduced.

Therefore, in the high pressure method, the selection of the kind and amount of emulsifier to be employed is important.

SUMMARY OF THE INVENTION

In accordance with the present invention, there is provided an aqueous dispersion of a copolymer prepared by the copolymerization of ethylene and vinyl acetate or by the copolymerization reaction of ethylene, vinyl acetate, and a compound copolymerizable with them. That is, there is provided an aqueous dispersion of a copolymer which contains 30–98% by weight ethylene and which comprises at least ethylene and vinyl acetate, which copolymer is prepared utilizing a ternary emulsifier comprising:

(A) a nonionic surface active agent having an HLB value of 16–21 or a mixture of such agents, (B) at least one anionic surface active agent selected from the sodium, potassium or ammonium salts of a lauryl alcohol sulfuric acid ester and the sodium or potassium salt of dodecylbenzene sulfonic acid, and (C) at least one high molecular weight protective colloid selected from a polyvinyl alcohol having a degree of polymerization of 400–2000 and containing 5–15% by weight of residual acetic acid groups, a water-soluble cellulose derivative, the proportion of said ternary emulsifiers, based upon the total emulsifier composition, being 5–75% by weight (A), 10–90% by weight (B), and 4–50% by weight (C).

DETAILED DESCRIPTION OF THE INVENTION

As stated above, the nonionic surface active agent used in the present invention has an HLB value of 16–21. Examples of such surface active agents are polyoxyethylene lauryl ether, oxyethylene-oxypropylene block polymer, polyoxyethylene nonylphenyl ether, and the like. However, emulsifiers having an aliphatic unsaturated bond are unsuitable, since they induce an intense transfer reaction.

If the HLB value of the nonionic surface active agent is lower than 16, a large amount must be used to obtain sufficient emulsification effect, whereby the proportion of resin in the solids content of the aqueous dispersion is reduced, while if the HLB value is higher than 21, a stable aqueous dispersion is not obtained.

The anionic surface active agent used in the present invention is selected from the sodium, potassium, and ammonium salts of a lauryl alcohol sulfuric acid ester and the sodium and potassium salts of dodecylbenzene sulfonic acid.

The high molecular weight protective colloid is selected from polyvinyl alcohol or a water-soluble cellulose. The polyvinyl alcohol is required to have a degree of polymerization of 400–2000 and 5–15% by weight of residual acetic acid groups. If polyvinyl alcohol not meeting these requirements is employed, a stable emulsified state is not obtained.

As the above water-soluble cellulose, there may be mentioned an alkyl cellulose, a hydroxyalkyl cellulose, a carboxyalkyl cellulose and the like.

These emulsifiers are employed in the above proportions. If they are used in other proportions than the above, the properties of the aqueous dispersion obtained are adversely affected.

The copolymer comprising at least ethylene and vinyl acetate and contained in the aqueous dispersion of the present invention contains 30–98% by weight ethylene.

An aqueous dispersion of an ethylene-vinyl acetate copolymer containing less than 30% by weight ethylene may be prepared by the conventional low pressure method as mentioned above, while if the copolymer contains more than 98% ethylene, it is necessary to use solvents other than water to increase the solids content of the aqueous dispersion, which is undesirable.

The preparation of the aqueous dispersion of the copolymer of this invention must be conducted at such a copolymerization pressure that the effect of the three emulsifiers is sufficiently obtained and hence the lower limit of the copolymerization pressure is several ten atmospheres.

There is no particular upper pressure limit but from an economical viewpoint, an upper limit of about 1000 atmospheres, preferably 100–500 atmospheres, is contemplated.

The polymerization temperature employed depends upon the nature of polymerization catalyst used, but is generally 10–80° C., preferably 40–70° C., considering reaction time, yield of copolymer, etc.

Compounds copolymerizable with ethylene and vinyl acetate which may be used in the present invention include, for example, vinyl chloride, vinylidene chloride, maleic acid, acrylic acid, methacrylic acid, acrylic acid esters, methacrylic acid esters, acrylamide, vinyl butyrate, etc. By properly selecting such compounds, the adhesivity, weathering resistance, softness and viscosity of the aqueous dispersion of this invention can be further improved, as desired.

According to this invention, it is possible to produce stable aqueous dispersions which have about 30–60% by weight solids and to reduce the proportion of emulsifier to solids to 6% by weight or less. Therefore, the aqueous dispersions of this invention are suitable for use as, for example, paints, adhesives, textile finishes, non-woven fabrics, paper coatings and the like, because water resistance, adhesivity and mechanical strength are improved by using smaller amounts of emulsifier than in conventional high pressure methods. In particular, aqeuous dispersions containing copolymers comprising 62–80% by weight ethylene are suitable for use as heat melting adhesives.

Various kinds of heat melting adhesives, mainly consisting of thermoplastic synthetic resins, have hitherto been proposed. Examples of these are polyethylene powders, polyethylene films, polyethylene fibers, and polyethylene-coated papers, which utilize polyethylene itself as a heat melting adhesive. These materials have the disadvantages that the adhesive power is weak and also that melting the polyethylene requires a prolonged period of time.

Further, there exist adhesives prepared by blending polyethylene and a thermoplastic synthetic resin, such as polyvinyl alcohol, polyisobutylene and a polyamide, or a thermosetting synthetic resin such as a melamine-formaldehyde resin and a urea-formaldehyde resin and then dissolving the blend in a solvent. However, such adhesives have the disadvantages that the covering power of the adhesives is weak as a result of the poor compatibility of polyethylene with other synthetic resins and further that the surface of the adhesive coating becomes sticky.

There have also been proposed fabric coating compositions prepared by blending a copolymer resin of acrylic acid or methacrylic acid or a copolymer of butadiene and acrylonitrile with a copolymer of an ethylenically unsaturated compound and vinyl chloride. However, a longer period of time is required to complete heat adhesion employing such materials.

Moreover, a heat melting composition prepared by incorporating 1–80% by weight of an ethylene-vinyl acetate copolymer in paraffin wax, microcrystalline wax, or petroleum wax has been proposed, but although such compositions possess high adhesive power when the wax content is small, they have the disadvantage that the temperature required for heat adhesion is relatively high. In some cases, with higher wax contents, the adhesive power is decreased and the wax is transuded onto the surface of the article to which the adhesive composition was applied. Furthermore, such adhesive compositions require an expensive coating apparatus for applying the composition to an article, regardless of the wax content. They are further accompanied with such disadvantages that viscosity change and coloring occur as a result of heat degradation of the adhesive by the heat melting process.

The aqueous dispersion of the present invention can be readily melted at comparatively low temperatures to provide strong adhesive power and further to provide, when cooled, a layer of adhesive which is excellent in water resistance, bending resistance, weathering resistance, washing resistance and chemical resistance to acids and alkalis.

Preferably, the copolymers contained in the aqueous dispersions of the present invention contain 62–80% by weight ethylene. As the content of ethylene in the copolymer increases above 80% by weight, the film forming temperature of the aqueous dispersion also increases to above 100° C., which reduces the practicability and the adhesivity of the adhesive. On the other hand, as the content of ethylene decreases below 62% by weight, the composition a tendency toward blocking occurs when the aqueous dispersion was applied to a group of articles which are then stacked.

Since the heat melting adhesive of the present invention is an aqueous dispersion, the application thereof to the surface of an article can be conducted at comparatively low temperatures, such as room temperature. Thus, the merit of the heat melting adhesives of the present invention will become apparent upon comparing them with the aforesaid conventional heat melting adhesives which require expensive coating apparatus, as the adhesive must be coated by dissolving them in a solvent at temperatures above their melting points and thereafter cooling.

That is, in the case of using the aqueous dispersion of the present invention as a heat melting adhesive, the adhesive composition is first applied to one of the articles to be bonded and dried, thus forming an adhesive layer thereon. The other article is then placed on the adhesive film thus formed and the film is heated whereby the articles are strongly bonded to each other by heat melting of the adhesive.

Thus, in the case of using the aqueous dispersion of the copolymer of ethylene and vinyl acetate of this invention, an expensive coating apparatus, such as an applicator, is not necessary and heating of the adhesive film may be instantly applied when conducting the adhesion operation.

Moreover, since the adhesive film obtained by applying the aqueous dispersion of the present invention is colorless and transparent, it provides the preferred cleanliness when it applied to food packages, etc.

The invention will be further illustrated by reference to the following examples.

EXAMPLE 1

In a one liter stainless steel autoclave 70 g. of vinyl acetate was added to 400 g. of an aqueous solution containing 8 g. of polyoxyethylene nonylphenyl ester (HLB value 17.8), 5 g. of sodium lauryl sulfate, 2 g. of polyvinyl alcohol having a polymerization degree of 1700 and 12% by weight of residual acetic acid groups, 1.5 g. of sodium dihydrogen phosphate, and 6 g. of ammonium persulfate. After purging the autoclave introducing ethylene at a pressure of about 10 kg./sq. cm. and heating until the inside temperature of the autoclave reacher 60° C., ethylene was introduced to the autoclave at a pressure of 300 kg./sq. cm. thereafter while maintaining the pressure in the autoclave constant by continually pressing ethylene therein, the copolymerization of the monomers was conducted for 2.1 hours. Then, after releasing the remaining ethylene, the reaction product was withdrawn.

In the reaction, 603 g. of a uniform aqueous dispersion having no large polymer particles was obtained using 327 g. of ethylene. The viscosity of the product measured at room temperature by means of a B-type viscometer was 430 c.p., the solid concentration thereof measured after concentrating and drying the aqueous dispersion was 34.4% by weight and the resin concentration obtained by removing the emulsifiers, catalyst, etc., from the solids content was 31.9% by weight.

When the aqueous dispersion was allowed to stand for 5 days at 60° C. in accordance with the high-temperature stability test of Japanese Industrial Stand (JIS) K6828–1964, no degradation was observed and the aqueous dispersion was stably maintained. The content of vinyl acetate in the copolymer obtained by deposition from the aqueous dispersion and purifying was 24% by weight and the specific viscosity of the aqueous dispersion was 0.079 liter/g.

The measurement of vinyl acetate content of the copolymer was conducted by measuring quantitatively the acetic acid formed by decomposing the copolymer at 450° C. by pyrolytic gas chromatography.

The measurement of the specific viscosity was made at 81° C. using p-xylene as solvent.

EXAMPLE 2–17

The same procedure as Example 1 was followed employing various amounts and kinds of starting materials, emulsifiers, etc., as shown in Table 1 and the results thus obtained are shown in the same table. In addition, the same procedure as above was also carried out while using other emulsifier compositions than those of the present invention and the results are shown in Table 2 as comparison examples.

TABLE 1

| Ex. No. | Emulsifier (g.) Anionic | Emulsifier (g.) Non-ionic | Emulsifier (g.) Protective | Vinyl acetate (g.) | Ethylene (g.) | Ammonium persulfate (g.) | Polymerization time (hrs.) | Yield aqueous dispersion (g.) | Weight percent Solids content | Weight percent Resin content | Viscosity (cp.) | High temp. stability | Mechanical stability (wt. percent) | Specific viscosity (l./g.) | Content of vinyl acetate (wt. percent) |
|---|---|---|---|---|---|---|---|---|---|---|---|---|---|---|---|
| 2 | H, 10 | D, 4 | M, 1 | 70 | 318 | 6 | 1.75 | 622 | 35.4 | 32.8 | 87 | >5 | 0.072 | 0.080 | 23 |
| 3 | H, 25 | D, 10 | M, 2.5 | 70 | 322 | 6 | 2.75 | 615 | 35.1 | 32.6 | 710 | 5 | 0.004 | 0.091 | 26 |
| 4 | H, 8.44 | D, 3.28 | M, 3.28 | 70 | 334 | 4 | 2.25 | 609 | 35.2 | 32.7 | 260 | >5 | 0.067 | 0.103 | 22 |
| 5 | H, 2.4 | D, 6.3 | M, 6.3 | 70 | 322 | 6 | 3.25 | 604 | 38.5 | 35.1 | 180 | 4 | 0.034 | 0.069 | 25 |
| 6 | H, 6.18 | D, 2.65 | M, 6.18 | 70 | 298 | 4 | 1.75 | 609 | 36.2 | 33.7 | 1,840 | >5 | 0.034 | 0.069 | 22 |
| 7 | H, 12.74 | D, 1.13 | M, 1.13 | 70 | 328 | 3 | 2.4 | 613 | 36.5 | 34.0 | 340 | 4 | | | 23 |
| 8 | H, 8.44 | G, 3.28 | M, 3.28 | 70 | 344 | 3 | 3.5 | 629 | 37.0 | 34.6 | 790 | 5 | | | 22 |
| 9 | H, 8.44 | C, 3.28 | M, 3.28 | 70 | 333 | 3 | 2.5 | 624 | 36.9 | 34.1 | 235 | >5 | | | 22 |
| 10 | H, 8.44 | E, 3.28 | M, 3.28 | 70 | 331 | 4 | 2.5 | 620 | 36.9 | 34.0 | 99 | >5 | | | 22 |
| 11 | I, 8.44 | D, 3.28 | M, 3.28 | 70 | 330 | 4 | 3.5 | 637 | 37.8 | 35.5 | 510 | >5 | | | 21 |
| 12 | H, 8.44 | D, 3.28 | R, 3.28 | 70 | 328 | 4 | 2.0 | 610 | 36.2 | 33.6 | 450 | >5 | | | 22 |
| 13 | H, 8.44 | D, 3.28 | L, 3.28 | 70 | 332 | 4 | 2.75 | 628 | 37.8 | 35.5 | 246 | 4–5 | | | 23 |
| 14 | H, 8.44 | G, 3.28 | L, 3.28 | 70 | 328 | 4 | 3.25 | 637 | 38.0 | 35.8 | 311 | >5 | | | 21 |
| 15 | H, 2.5 | D, 10 | M, 2.5 | 105 | 320 | 6 | 2.4 | 628 | 37.6 | 35.2 | 100 | 4 | 0.055 | 0.127 | 32 |
| 16 | H, 2.5 | D, 10 | M, 2.5 | 125 | 309 | 4 | 2.75 | 705 | 39.2 | 36.4 | | >5 | | | 40 |
| 17 | H, 2.5 | D, 10 | M, 2.5 | 15 | 345 | 6 | 3.5 | 513 | 31.4 | 27.1 | | >5 | 0.011 | | 5 |

TABLE 2

| Comparative Example No. | Emulsifier (g.) Anionic | Emulsifier (g.) Nonionic | Emulsifier (g.) Protective colloid | Vinyl acetate (g.) | Ethylene (g.) | Ammonium persulfate (g.) | Polymerization time (hrs.) | Yield of aqueous dispersion (g.) | State of aqueous dispersion | High temp. stability | Content of vinyl acetate weight (percent) |
|---|---|---|---|---|---|---|---|---|---|---|---|
| 1 | | D, 7.5 | M, 7.5 | 70 | 330 | 6 | 4.5 | | Broken | | 25 |
| 2 | | D, 12.0 | M, 3.0 | 70 | 330 | 6 | 4.25 | | do | | 23 |
| 3 | H, 7.5 | | M, 7.5 | 70 | 330 | 6 | 2.75 | | do | | 22 |
| 4 | H, 12.0 | | M, 3.0 | 70 | 331 | 4 | 2.25 | 595 | Slightly good | <1 | 25 |
| 5 | H, 2.55 | D, 12.45 | | 70 | 236 | 6 | 3.0 | | Broken | | 25 |
| 6 | H, 10.65 | D, 4.35 | | 70 | 331 | 4 | 2.4 | | do | | 22 |
| 7 | H, 2.52 | D, 1.03 | M, 11.45 | 70 | 330 | 3 | 4.5 | | do | | 26 |
| 8 | H, 1.13 | D, 9.75 | M, 4.12 | 70 | 330 | 6 | 3.9 | | do | | 23 |
| 9 | H, 1.13 | D, 12.74 | M, 1.13 | 70 | 334 | 6 | 3.9 | | do | | 22 |
| 10 | H, 8.44 | D, 3.28 | N, 3.28 | 70 | 332 | 4 | 2.6 | | do | | 23 |
| 11 | H, 8.44 | D, 3.28 | O, 3.28 | 70 | 335 | 4 | 2.75 | | do | | 22 |
| 12 | H, 8.44 | D, 3.28 | P, 3.28 | 70 | 333 | 4 | 3.0 | | do | | 22 |
| 13 | H, 8.44 | D, 3.28 | Q, 3.28 | 70 | 328 | 4 | 2.75 | | do | | 22 |
| 14 | H, 2.5 | A, 10 | M, 2.5 | 125 | 312 | 3 | 3.0 | | do | | 41 |
| 15 | H, 2.5 | B, 10 | M, 2.5 | 125 | 308 | 3 | 2.75 | | do | | 40 |
| 16 | J, 8.44 | D, 3.28 | M, 3.28 | 70 | 233 | 6 | 2.0 | | Would not polymerize | | |
| 17 | K, 8.44 | D, 3.28 | M, 3.28 | 70 | 232 | 6 | 1.25 | | Would not polymerize | | |
| 18 | H, 5 | B, 20 | M, 5 | 55 | 305 | 2 | 1.75 | 582 | Good | >5 | 18 |
| 19 | H, 5 | B, 25 | | 125 | 288 | 2 | 2.25 | 598 | do | >5 | 42 |
| 20 | H, 5 | G, 25 | | 105 | 303 | 5 | 2.25 | 644 | do | >5 | 31 |
| 21 | H, 5 | F, 20 | | 125 | 212 | 3 | 3 | | Would not polymerize | | |
| 22 | H, 5 | D, 5 | | 57 | 223 | 2 | 2 | | Broken | | 40 |
| 23 | H, 0.75 | D, 8.5 | M, 0.75 | 57 | 217 | 2 | 2.5 | | do | | 40 |

The abbreviations used in the above tables are as follows:

| Abbreviation | Emulsifier | HLB value |
|---|---|---|
| A | Polyoxyethylene lauryl ether | 10.5 |
| B | do | 15.3 |
| C | do | 17.1 |
| D | Polyoxyethylene nonylphenyl ether | 17.8 |
| E | do | 18.9 |
| F | Polyoxyethylene oleyl ether | 16.2 |
| G | Oxyethylene-oxypropylene block copolymer | 17.5 |
| H | Sodium lauryl sulfate | |
| I | Sodium dodecylbenzene sulfonate | |
| J | Aliphatic potassium soap | |
| K | Semi-cured beef tallow potassium soap | |
| L | Polyvinyl alcohol (degree of polymerization 500, residual acetic acid groups, 12% by weight). | |
| M | Polyvinyl alcohol (degree of polymerization 1,700, residual acetic acid groups, 12% by weight). | |
| N | Polyvinyl alcohol (degree of polymerization 1,700, residual acetic acid groups 1% by weight). | |
| O | Polyvinyl alcohol (degree of polymerization 2,000, residual acetic acid group, 18% by weight). | |
| P | Polyethylene glycol (mean mol. weight 200) | |
| Q | Polyethylene glycol (mean mol. weight 400) | |
| R | Monomethylcellulose | |

The mechanical stability was measured by using a Maron test machine. That is, 50 ml. of the aqueous dispersion was placed in a 200 ml. vessel, a rotary disc is rotated in the aqueous dispersion for 5 minutes at a rate of 2000 r.p.m. while applying a load of 10 kg. to the rotary disc, the rotary disc was withdrawn, the aqueous dispersion attached to the disc was recovered in a sample vessel by washing with water, the sample thus recovered was filtered, washed with water, and dried, and the mechanical stability (M.S.) was calculated by the following equation $$M.S. = \frac{(X)}{(Y)} \times 100$$

wherein (X) is the amount of coagulate (g.) and (Y) is the solids content (g.) of the aqueous dispersion recovered from the disc.

EXAMPLE 18

In a one liter stainless steel autoclave, 57 g. of vinyl acetate was added to 200 g. of an aqueous solution containing 2 g. of polyoxyethylene nonylphenyl ether having an HLB value of 17.8, 5 g. of sodium lauryl sulfate, 3 g. of polyvinyl alcohol having a polymerization degree of 1700 and 12% by weight residual acetic acid groups, 1.5 g. of sodium dihydrogen phosphate, and 2 g. of ammonium persulfate. After purging the autoclave by introducing ethylene at a pressure of about 10 kg./sq. cm. and heating the autoclave until the inside temperature reached 60° C., ethylene was introduced into the autoclave to a pressure of 100 kg./sq. cm. and, while maintaining the inside pressure constant by continually pressuring in ethylene, the copolymerization reaction was conducted for 2 hours. After releasing the ethylene remaining in the autoclave, the reaction product was withdrawn.

In the reaction, 330 g. of an aqueous dispersion having a solids concentration of 39.2% by weight and a resin concentration of 33.4% by weight was obtained using 225 g. of ethylene.

The aqueous dispersion possessed good high temperature stability, the vinyl acetate content in the copolymer of the aqueous dispersion was 43% by weight and the specific viscosity of the aqueous dispersion was 0.043 liter/g.

For comparison purposes, attention is directed to comparison Examples 22 and 23 as shown in Table 2, above.

EXAMPLES 19-22

Into an autoclave equipped with a stirrer were charged 400 parts by weight of distilled water, 4 parts by weight of ammonium peroxydisulfate, 1.5 parts by weight of potassium hydrogen phosphate, 4 parts by weight of polyoxyethylene nonylphenyl ether having an HLB of 17.8, 10 parts by weight of sodium laurylsulfate, 1 part by weight of polyvinyl alcohol having a mean polymerization degree of 1720 and 12% by weight residual acetic acid groups, and 70 parts by weight of vinyl acetate.

Then, after purging the autoclave with 10 kg./sq. cm. of ethylene, ethylene was introduced into the system to a pressure of 100 kg./sq. cm. and the system was heated for 15 minutes to 60° C., whereby the inside pressure of the autoclave reached 25° kg./sq. cm. After further supplying ethylene to increase the inside pressure to 300 kg./sq. cm., the copolymerization was conducted for 3 hours while maintaining the inside pressure at 300 kg./sq. cm. by further supplying ethylene. After the reaction was over, the reaction system was cooled and the unreacted ethylene was purged.

By the reaction, 603 parts by weight of an aqueous dispersion of an ethylene-vinyl acetate copolymer containing 35.4% by weight solids was obtained. The content of vinyl acetate in the copolymer was 22% by weight and the ratio of the emulsifiers to the total solids content was 6.9% by weight.

The film forming temperature of the aqueous dispersion thus prepared was 80° C. The film formed from the emulsion showed no blocking tendency and could be readily adhered by heating the film to temperatures above 100 C.

The same procedure was also repeated while varying the amounts of vinyl acetate and emulsifiers and also the kinds of emulsifiers. The results are shown in Table 3, together with comparison examples.

TABLE 3

| Example number | Vinyl acetate (g.) | Emulsifier (g.) | Polymerization time (hrs.) | State of aqueous dispersion | Yield | Solids content | Ratio of emulsifiers to total solids content | Content of vinyl acetate | Storage stability |
|---|---|---|---|---|---|---|---|---|---|
| 19 | 70 | A, 4; B, 10; C, 1 | 3 | Good | 603 | 35.4 | 6.9 | 22 | Unchanged after 1 month. |
| 24 [1] | 70 | A, 3.7; B, 21.3 | 3.5 | do | 605 | 36.2 | 13.7 | 21 | Do. |
| 25 [1] | 70 | A, 4.35; B, 10.65 | 3.1 | Bad | | | | | |
| 26 [1] | 55 | A, 4; A, 10; C, 1 | 3.5 | Good | 612 | 37.5 | 6.5 | 19 | Do. |
| 20 | 110 | D, 6.8; E, 1.5; F, 6.7 | 4.1 | do | 604 | 38.5 | 6.5 | 35 | Do. |
| 27 [1] | 110 | D, 7.5; F, 7.5 | 6.0 | Bad | 580 | | | | |
| 28 [1] | 110 | D, 15; F, 15 | 6.5 | Good | 602 | 38 | 13.1 | 34 | Do. |
| 29 [1] | 125 | D, 6.8; E, 1.5; F, 6.7 | 3.5 | do | 510 | 37.3 | 6.6 | 40 | Do. |
| 21 | 110 | G, 2.8; I, 7.2; C, 0.7 | 2.7 | do | 630 | 42.5 | 4.1 | 36 | Do. |
| 22 | 90 | H, 12; I, 1.5; J, 1.5 | 2.7 | do | 612 | 31.5 | 6.5 | 28 | Do. |

[1] Comparison examples.

The following abbreviations are employed in Table 3.

| Abbreviation | Emulsifier |
|---|---|
| A | Polyoxyethylene nonylphenyl ether having an HLB value of 17.8 |
| B | Sodium laurylsulfate. |
| C | Polyvinyl alcohol having a mean polymerization degree of 1,720 and 12% by weight residual acetic acid groups. |
| D | Polyoxyethylene lauryl ether having an HLB value of 17.1. |
| E | Sodium lauryl sulfate. |
| F | Monomethyl cellulose. |
| G | Polyoxyethylene nonylphenyl ether having an HLB value of 18.9. |
| H | Pluronic F68 having an HLB value of 17.5 (an ethylene oxide-propylene oxide block copolymer made by Asahi Denka Kogyo K.K.). |
| I | Sodium dodecylbenzene sulfonate. |
| J | Polyvinyl alcohol having a mean polymerization degree of 600 and 12% by weight residual acetic acid groups. |

The adhesivity, the anti-blocking property, and the film forming temperature of the aqueous dispersions thus prepared are shown in Table 4.

TABLE 4

| Example | Adhesivity | Anti-blocking property | Film forming temperature (° C.) |
|---|---|---|---|
| 19 | Good | Good | 80 |
| 20 | do | do | 30 |
| 21 | do | do | 23 |
| 22 | do | do | 57 |
| 24 [1] | Bad | do | 70 |
| 26 [1] | Good | do | 140 |
| 29 [1] | Bad | do | 25 |

[1] Comparison examples.

The anti-blocking property was measured as follows: After forming a film of the aqueous dispersion on a kraft paper by applying the dispersion thereto, another kraft paper was placed on the film and they were allowed to stand for 24 hours at 40° C. under pressure of 500 g./cm.$^2$. Thereafter, the kraft paper was stripped and the state was observed. When the kraft paper could be stripped without resistance, the anti-blocking property was defined to be good.

The film forming temperature was determined as follows: The aqueous dispersion was applied to a glass plate in a thickness of 0.5 mm. and dried. In this case, the minimum temperature at which a uniform film was formed without being accompanied by cracking was determined and defined as the film forming temperature.

Adhesivity was determined as follows: The aqueous dispersion was applied to a kraft paper to form a film and dried. Thereafter, another kraft paper was placed on the film and they were bonded by heating to 120° C. When the two kraft papers were stripped from each other, the adhesivity was considered bad if they could be stripped without resistance and was considered good when they were bonded to such extent that the papers were torn.

What is claimed is:

1. An aqueous dispersion of a copolymer of ethylene and vinyl acetate, said copolymer containing 30 to 98% by weight of ethylene, said aqueous dispersion having been prepared by copolymerization of ethylene and vinyl acetate in the presence of an emulsifier composition consisting essentially of:
   (A) 5 to 75% by weight of a nonionic surface active agent having an HLB value of 16-21 and having no aliphatic unsaturated bonds;
   (B) 10 to 90% by weight of an anionic surface active agent selected from the group consisting of sodium, potassium and ammonium salts of lauryl alcohol sulfuric acid ester and sodium and potassium salts of dodecylbenzene sulfonic acid, and
   (C) 4 to 50% by weight of a high molecular weight protective colloid selected from the group consisting of:
       (1) polyvinyl alcohol having a degree of polymerization of 400–2000 and containing 5 to 15% by weight of residual acetic groups,
       (2) alkyl cellulose,
       (3) hydroxyalkyl cellulose and
       (4) carboxyalkyl cellulose,
   said percentages being based upon the total weight of emulsifier composition present.

2. The aqueous dispersion of claim 1 wherein said nonionic surface active agent is selected from the group consisting of polyoxyethylene lauryl ether, an oxyethylene-oxypropylene block copolymer and a polyoxyethylene nonylphenyl ether.

3. The aqueous dispersion of claim 1, wherein said polymer is an ethylene-vinyl acetate copolymer and wherein said high molecular weight protective colloid is a polyvinyl alcohol having a degree of polymerization of 400–2000 and containing 5–15% by weight of residual acetic acid groups.

4. The aqueous dispersion of claim 3, wherein said nonionic surface active agent is selected from the group consisting of polyoxyethylene lauryl ether, an oxyethylene-oxypropylene block copolymer and a polyoxyethylene nonylphenyl ether.

5. A heat melting adhesive comprising an aqueous dispersion of a copolymer of ethylene and vinyl acetate, said copolymer containing 62 to 80% by weight ethylene, said aqueous dispersion having been prepared by copolymerization of ethylene and vinyl acetate in the presence of an emulsifier composition consisting essentially of:
   (A) 5 to 75% by weight of non-ionic surface active agent having an HLB value of 16-21 and having no aliphatic unsaturated bonds,
   (B) 10 to 90% by weight of an anionic surface active agent selected from the group consisting of sodium, potassium and ammonium salts of lauryl alcohol sulfuric acid ester and sodium and potassium salts of dodecylbenzene sulfonic acid and
   (C) 4 to 50% by weight of a high molecular weight protective colloid selected from the group consisting of:
       (1) polyvinyl alcohol having a degree of polymerization of 400–2000 and containing 5 to 15% by weight of residual acetic acid groups,
       (2) alkyl cellulose,
       (3) hydroxyalkyl cellulose and
       (4) carboxyalkyl cellulose,
   said percentages being based upon the total weight of emulsifier composition present.

6. The heat melting adhesive of claim 5 wherein said nonionic surface active agent is selected from the group consisting of polyoxyethylene lauryl ether, an oxyethyleneoxypropylene block copolymer and a polyoxyethylene nonylphenyl ether.

7. The heat melting adhesive of claim 5, wherein the polymer is an ethylene-vinyl acetate copolymer and wherein said high molecular weight protective colloid is a polyvinyl alcohol having a degree of polymerization of 400–2000 and containing 5–15% by weight of residual acetic acid groups.

8. The heat melting adhesive of claim 7, wherein said nonionic surface active agent is selected from the group consisting of poloxyethylene lauryl ether, an oxyethylene-oxypropylene block copolymer and a polyoxyethylene nonylphenyl ether.

9. In a process of preparing an aqueous dispersion of a copolymer of ethylene and vinyl acetate, said copolymer containing 30 to 98% by weight ethylene, which process comprises subjecting ethylene and vinyl acetate to emulsion polymerization conditions, the improvement which comprises carrying out the polymerization in the presence of an emulsifier composition consisting essentially of
   (A) 5 to 75% by weight of a nonionic surface active agent having an HLB value of 16-21 and having no aliphatic unsaturated bonds, (B) 10 to 90% by weight of an anionic surface active agent selected from the group consisting of sodium, potassium and ammonium salts of lauryl alcohol sulfuric acid ester acid and (C) 4 to 50% by weight of high molecular weight protective colloid selected from the group consisting of:
(1) polyvinyl alcohol having a degree of polymerization of 400-2000 and containing 5 to 15% by weight of residual acetic acid groups,
(2) alkyl cellulose,
(3) hydroxyalkyl cellulose and
(4) carboxyalkyl cellulose, said percentages being based upon the total weight of emulsifier composition present.

10. The process of claim 9 wherein said nonionic surface active agent is selected from the group consisting of polyoxyethylene lauryl ether, an oxyethylene-oxypropylene block copolymer and a polyoxyethylene nonylphenyl ether.

11. The process of claim 9 wherein said polymer is an ethylene-vinyl acetate copolymer and wherein said high molecular weight protective colloid is a polyvinyl alcohol having a degree of polymerization of 400-2000 and containing 5-15% by weight of residual acetic acid group.

12. The process of claim 11, wherein said nonionic surface active agent is selected from the group consisting of polyoxyethylene lauryl ether, an oxyethylene-oxypropylene block copolymer and a polyoxyethylene nonylphenyl ether.

References Cited
UNITED STATES PATENTS

| | | | |
|---|---|---|---|
| 2,703,794 | 3/1955 | Roedel | 260—29.6 TA |
| 3,150,110 | 9/1964 | Becker et al. | 260—17 R |
| 3,256,228 | 6/1966 | Tyran | 260—29.6 ME |
| 3,329,640 | 7/1967 | Scotti et al. | 260—29.6 ME |
| 3,355,322 | 11/1967 | Worrall et al. | 260—29.6 WA X |
| 3,399,157 | 8/1968 | Deex et al. | 260—29.6 ME |
| 3,440,200 | 4/1969 | Lindemann et al. | 260—29.6 ME |
| 3,547,845 | 12/1970 | Pinkney | 260—17 R |
| 3,553,184 | 1/1971 | Lederer et al. | 260—29.6 ME |

WILLIAM SHORT, Primary Examiner

L. M. PHYNES, Assistant Examiner

U.S. Cl. X.R.

117—121, 161 C; 260—17 R, 29.6 ME, WA, 29.6 WB, T, TA, 80.8, 80.81, 87.1, 87.3

UNITED STATES PATENT OFFICE
CERTIFICATE OF CORRECTION

Patent No. 3,692,723                    Dated September 19, 1972

Inventor(s)    Masanori Kasagi and Koreaki Gunjigake

It is certified that error appears in the above-identified patent and that said Letters Patent are hereby corrected as shown below:

IN THE CLAIMS:

Column 10, line 5, "hydroxyallkyl" should read --hydroxyalkyl--;

line 6, "carboxyallkyl" should read --carboxyalkyl--.

Column 11, line 4, after "ester" insert --and sodium and potassium salts of dodecylbenzene sulfonic--.

Signed and sealed this 5th day of November 1974.

(SEAL)
Attest:

McCOY M. GIBSON JR.
Attesting Officer

C. MARSHALL DANN
Commissioner of Patents